(12) United States Patent
Turse

(10) Patent No.: US 11,545,731 B2
(45) Date of Patent: Jan. 3, 2023

(54) DEPLOYABLE TILE APERTURE DEVICES, SYSTEMS, AND METHODS

(71) Applicant: Roccor, LLC, Longmont, CO (US)

(72) Inventor: Dana Turse, Broomfield, CO (US)

(73) Assignee: Roccor, LLC, Longmont, CO (US)

( * ) Notice: Subject to any disclaimer, the term of this patent is extended or adjusted under 35 U.S.C. 154(b) by 0 days.

(21) Appl. No.: 17/085,670

(22) Filed: Oct. 30, 2020

(65) Prior Publication Data

US 2021/0143520 A1 May 13, 2021

Related U.S. Application Data

(60) Provisional application No. 62/927,780, filed on Oct. 30, 2019.

(51) Int. Cl.
*H01Q 1/08* (2006.01)
*H01Q 21/06* (2006.01)
(Continued)

(52) U.S. Cl.
CPC ............... *H01Q 1/085* (2013.01); *H01Q 1/44* (2013.01); *H01Q 1/48* (2013.01); *H01Q 15/14* (2013.01);
(Continued)

(58) Field of Classification Search
CPC .... H01Q 15/14; H01Q 15/147; H01Q 15/161; H01Q 15/165; H01Q 21/06; H01Q 21/061; H01Q 21/065
See application file for complete search history.

(56) References Cited

U.S. PATENT DOCUMENTS 4,725,025 A * 2/1988 Binge .................. H01Q 1/1235
244/172.6
4,832,113 A * 5/1989 Mims ..................... B64G 1/503
165/41
(Continued)

OTHER PUBLICATIONS

Huang, J. et al., "Foldable Frame-Supported Thin-Membrane Array," Proceedings of the 2000 International Symposium on Antennas and Propagation (ISAP), Fukuoka, Japan, Aug. 2000, pp. 213-216.
(Continued)

*Primary Examiner* — Jason Crawford
(74) *Attorney, Agent, or Firm* — Wilson Patent Law, LLC

(57) ABSTRACT

Deployable tile aperture devices, systems, and methods are provided in accordance with various embodiments. Some embodiments include a device that may include multiple aperture tiles that may be coupled with each other such the multiple aperture tiles have a stacked stowed configuration and a flat deployed configuration. Some embodiments include one or more tension chords configured to deploy the multiple aperture tiles when tension is applied to the one or more tension chords. The flat deployed configuration may include at least one side edge portion of each aperture tile from the multiple aperture tiles making contact with another side edge portion of another aperture tile from the multiple aperture tiles. The flat deployed configuration may form one or more continuous face surfaces formed from the multiple aperture tiles. The one or more tension chords may pass through at least a portion of one or more of the multiple aperture tiles.

16 Claims, 15 Drawing Sheets

(51) Int. Cl.
*H01Q 15/14* (2006.01)
*H02S 40/36* (2014.01)
*H01Q 1/44* (2006.01)
*H02S 30/20* (2014.01)
*H01Q 1/48* (2006.01)

(52) U.S. Cl.
CPC .......... *H01Q 21/061* (2013.01); *H02S 30/20* (2014.12); *H02S 40/36* (2014.12)

(56) References Cited

U.S. PATENT DOCUMENTS

| | | | | |
|---|---|---|---|---|
| 5,319,905 A * | 6/1994 | Szirtes | ............ | B64G 1/222 244/172.6 |
| 5,515,900 A * | 5/1996 | West | ............ | G09F 15/0068 160/230 |
| 5,520,747 A * | 5/1996 | Marks | ............ | B64G 1/443 136/246 |
| 5,785,280 A * | 7/1998 | Baghdasarian | ........ | B64G 1/222 244/172.6 |
| 5,909,860 A * | 6/1999 | Lee | ............ | H01L 31/0547 136/246 |
| 5,927,654 A * | 7/1999 | Foley | ............ | H01Q 1/28 244/172.6 |
| 6,091,016 A * | 7/2000 | Kester | ............ | H02S 30/20 136/292 |
| 6,343,442 B1 * | 2/2002 | Marks | ............ | B64G 1/222 244/172.6 |
| 6,505,381 B1 * | 1/2003 | Thomson | ............ | B64G 1/222 16/302 |
| 6,637,702 B1 * | 10/2003 | McCandless | ........... | H02S 30/20 244/172.6 |
| 7,211,722 B1 * | 5/2007 | Murphy | ............ | H02S 20/00 52/645 |
| 8,308,111 B2 * | 11/2012 | Lu | ............ | F03G 6/00 136/246 |
| 9,637,248 B2 * | 5/2017 | Cook, Jr. | ............ | H02S 20/30 |
| 2005/0126106 A1 * | 6/2005 | Murphy | ............ | B64G 1/222 52/652.1 |
| 2010/0045563 A1 * | 2/2010 | Thompson | ............ | H01Q 1/288 343/881 |
| 2012/0227916 A1 * | 9/2012 | Kellberg | ............ | H01Q 21/061 160/405 |
| 2012/0325974 A1 * | 12/2012 | Baudasse | ............ | B64G 1/222 244/172.6 |
| 2013/0207880 A1 * | 8/2013 | Taylor | ............ | H01Q 15/20 343/915 |
| 2018/0175785 A1 * | 6/2018 | Rakow | ............ | H02S 10/40 |
| 2018/0278200 A1 * | 9/2018 | Jeon | ............ | H02S 30/20 |
| 2021/0143520 A1 * | 5/2021 | Turse | ............ | H01Q 1/48 |

OTHER PUBLICATIONS

Mikulas, M. et al., "Conceptual Design and Analysis of an Advanced Deployable Radar System—Phase I," JPLD-14716 (1997).
Saito, H. et al., "Compact X-Band Synthetic Aperture Radar for 100 kg Class Satellite," IEICE Trans. Commun., vol. E100-B, No. 9, Sep. 2017, pp. 1653-1660.

* cited by examiner

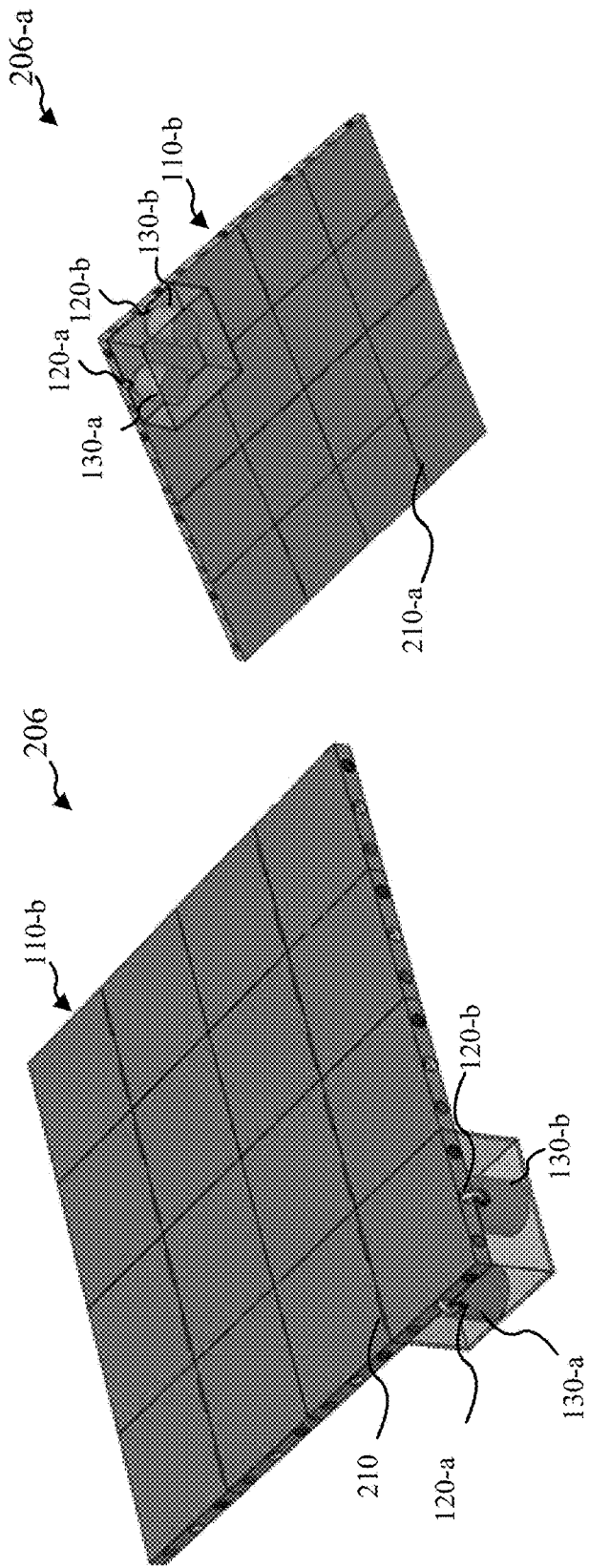
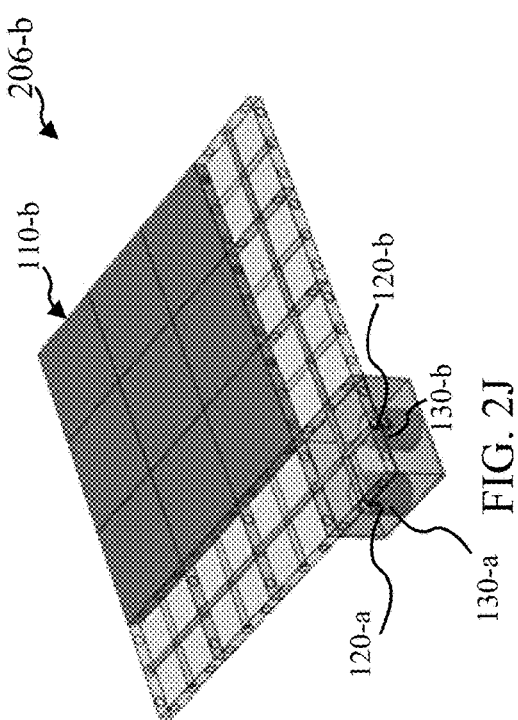

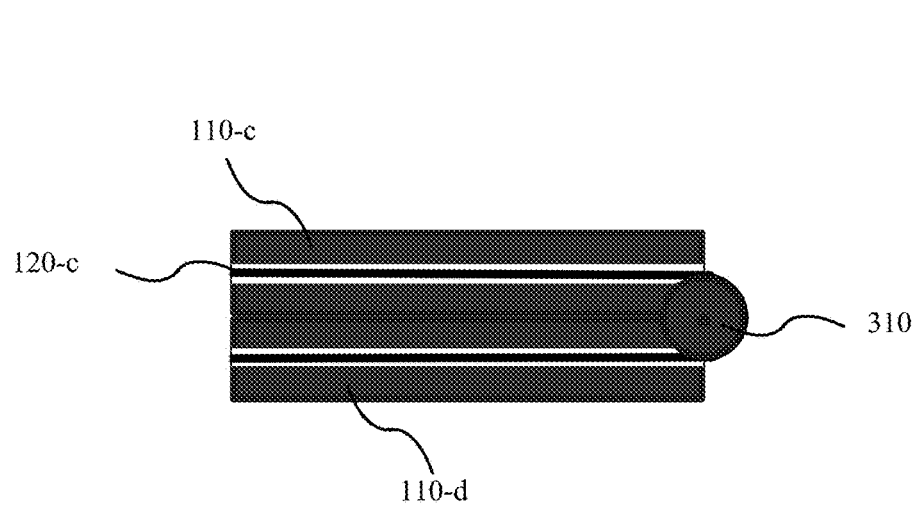
FIG. 3A
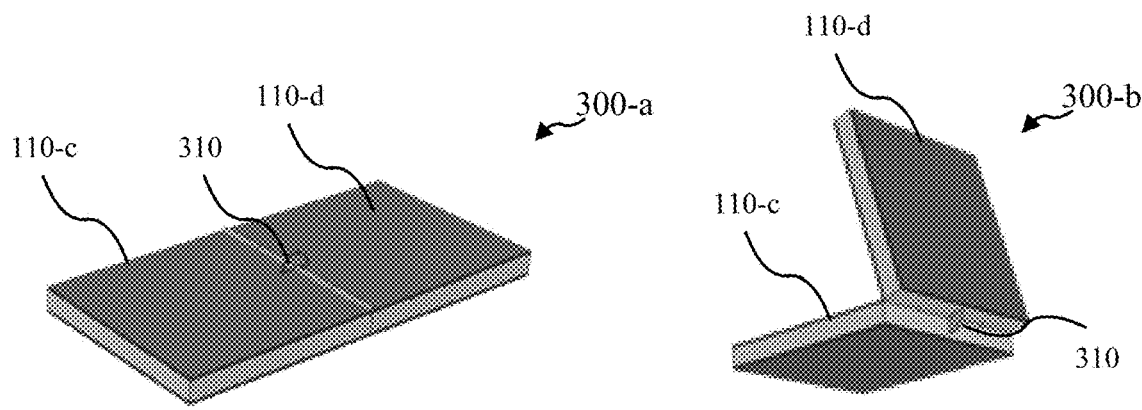
FIG. 3B
FIG. 3C
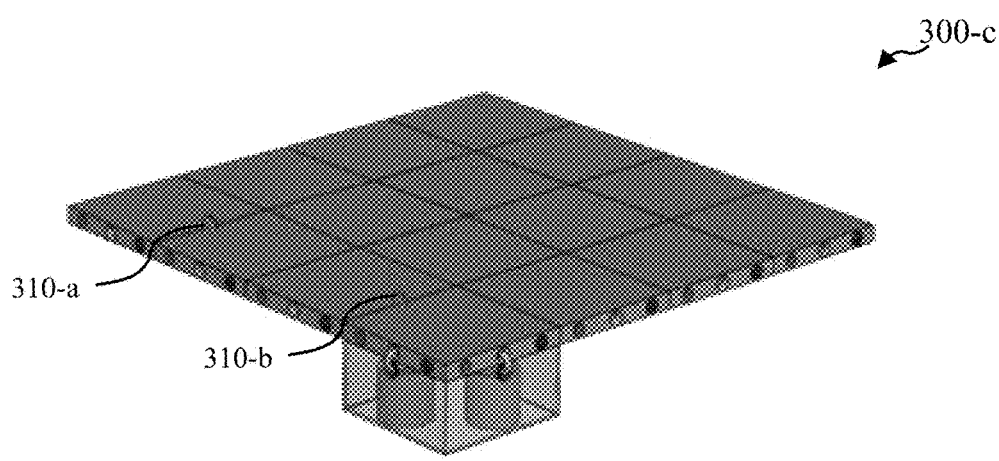
FIG. 3D

DEPLOYABLE TILE APERTURE DEVICES, SYSTEMS, AND METHODS

CROSS-REFERENCES TO RELATED APPLICATIONS

This application is a non-provisional patent application claiming priority benefit of U.S. provisional patent application Ser. No. 62/927,780, filed on Oct. 30, 2019 and entitled "DEPLOYABLE TILE APERTURE DEVICES, SYSTEMS, AND METHODS," the entire disclosure of which is herein incorporated by reference for all purposes.

BACKGROUND

Different tools and techniques have been utilized for apertures, such as RF apertures and/or arrays. These may include rollable or furlable devices. There may be a need for new tools and techniques for deploying apertures.

SUMMARY

Deployable tile aperture devices, systems, and methods are provided in accordance with various embodiments. For example, some embodiments include a device that may include multiple aperture tiles that may be coupled with each other such that the multiple aperture tiles have a stacked stowed configuration and a flat deployed configuration.

Some embodiments include one or more tension chords configured to deploy the multiple aperture tiles when tension is applied to the one or more tension chords. In some embodiments, the flat deployed configuration includes at least one side edge portion of each aperture tile from the multiple aperture tiles making contact with another side edge portion of another aperture tile from the multiple aperture tiles. In some embodiments, the flat deployed configuration forms one or more continuous face surfaces formed from the multiple aperture tiles. In some embodiments, the one or more tension chords pass through at least a portion of one or more of the multiple aperture tiles.

In some embodiments, the multiple aperture tiles are configured as a radio frequency aperture. The radio frequency aperture may include a radio frequency reflective side and a ground plane side formed from the multiple aperture tiles. In some embodiments, the multiple aperture tiles are configured as a solar array aperture.

Some embodiments include multiple pulleys, where each respective pulley from the multiple pulleys may be positioned with respect to a hinge line between two aperture tiles from the multiple aperture tiles and/or may make contact with a portion of at least one of the one or more tension chords.

In some embodiments, the multiple aperture tiles include multiple cap and cone structures configured to couple with each other when the multiple aperture tiles are deployed to the flat deployed configuration.

Some embodiments include one or more tension cable spools and/or motors configured to facilitate deployment of the multiple aperture tiles from the stacked stowed configuration to the flat deployed configuration. Some embodiments include a constant force spring configured to facilitate deployment of the multiple aperture tiles from the stacked stowed configuration to the flat deployed configuration.

In some embodiments, the multiple cap and cone structures include multiple conductive pin structures and multiple conductive pad structures to facilitate electrical connectivity between the multiple aperture tiles.

Some embodiments include multiple flex circuits configured to facilitate electrical connectivity between the multiple aperture tiles. Some embodiments include multiple spring hinges positioned between the multiple aperture tiles to facilitate deployment of the multiple aperture tiles from the stacked stowed configuration to the flat deployed configuration. Some embodiments include multiple interlocking wedge elements configured to interlock when the multiple aperture tiles are in the flat deployed configuration.

Some embodiments include a method of deploying multiple aperture tiles that may include applying tension to a first tension chord that passes through two of more of multiple aperture tiles to deploy the multiple aperture tiles with respect to a first direction. Some embodiments include applying tension to a second tension chord that passes through two of more of the multiple aperture tiles to deploy the multiple aperture tiles with respect to a second direction that is perpendicular to the first direction.

Some embodiments include a system that may include multiple aperture tiles configured to deploy from a stowed configuration to a deployed configuration and/or a feed horn.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A, FIG. 2B, FIG. 2C, FIG. 2D, FIG. 2E, FIG. 2F, FIG. 2G, FIG. 2H, FIG. 2I, and FIG. 2J show devices in accordance with various embodiments.

FIG. 3A, FIG. 3B, FIG. 3C, and FIG. 3D show devices in accordance with various embodiments.

DETAILED DESCRIPTION

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Deployable tile aperture devices, systems, and methods are provided in accordance with various embodiments. Embodiments may generally include multiple tiles, which may be stackable for a stowed configuration. Deployed configurations may form a flat aperture. In some embodiments, there may be no gaps between the deployed tiles, which may provide for more structural stability. The deployable tile aperture devices, systems, and methods may have both space and terrestrial applications, including, but not limited to, RF apertures and solar arrays.

Figure 1A:
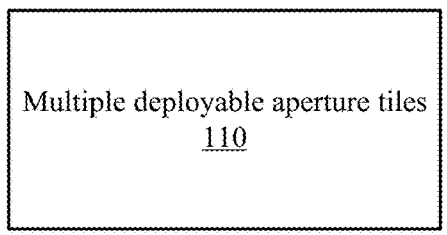
FIG. 1A shows a device in accordance with various embodiments.

Turning now to FIG. 1A, a device 100 is provided in accordance with various embodiments. Device 100 may include multiple aperture tiles 110 that may be coupled with each other such that the multiple aperture tiles 110 have a stacked stowed configuration and a flat deployed configuration. Device 100 may be referred to as a deployable tile aperture device in some embodiments.

Some embodiments of device 100 include one or more tension chords configured to deploy the multiple aperture tiles 110 when tension is applied to the one or more tension chords. In some embodiments, the flat deployed configuration includes at least one side edge portion of each aperture tile from the multiple aperture tiles 110 making contact with another side edge portion of another aperture tile from the multiple aperture tiles. In some embodiments, the flat deployed configuration forms one or more continuous face surfaces formed from the multiple aperture tiles 110. In some embodiments, the one or more tension chords pass through at least a portion of one or more of the multiple aperture tiles 110.

In some embodiments of device 100, the multiple aperture tiles 110 are configured as a radio frequency aperture. The radio frequency aperture may include a radio frequency reflective side and a ground plane side formed from the multiple aperture tiles 110. In some embodiments, the multiple aperture tiles 110 are configured as a solar array aperture.

Some embodiments of device 100 include multiple pulleys, where each respective pulley from the multiple pulleys may be positioned with respect to a hinge line between two aperture tiles from the multiple aperture tiles 110 and/or may make contact with a portion of at least one of the one or more tension chords.

In some embodiments of device 100, the multiple aperture tiles 110 include multiple cap and cone structures configured to couple with each other when the multiple aperture tiles 110 are deployed to the flat deployed configuration.

Some embodiments of device 100 include one or more tension cable spools and/or motors configured to facilitate deployment of the multiple aperture tiles 110 from the stacked stowed configuration to the flat deployed configuration. Some embodiments of device 100 include a constant force spring configured to facilitate deployment of the multiple aperture tiles 110 from the stacked stowed configuration to the flat deployed configuration.

In some embodiments of device 100, the multiple cap and cone structures include multiple conductive pin structures and multiple conductive pad structures to facilitate electrical connectivity between the multiple aperture tiles 110.

Some embodiments of device 100 include multiple flex circuits configured to facilitate electrical connectivity between the multiple aperture tiles 110. Some embodiments include multiple spring hinges positioned between the multiple aperture tiles 110 to facilitate deployment of the multiple aperture tiles from the stacked stowed configuration to the flat deployed configuration. Some embodiments include multiple interlocking wedge elements configured to interlock when the multiple aperture tiles 110 are in the flat deployed configuration.

Figure 1B:
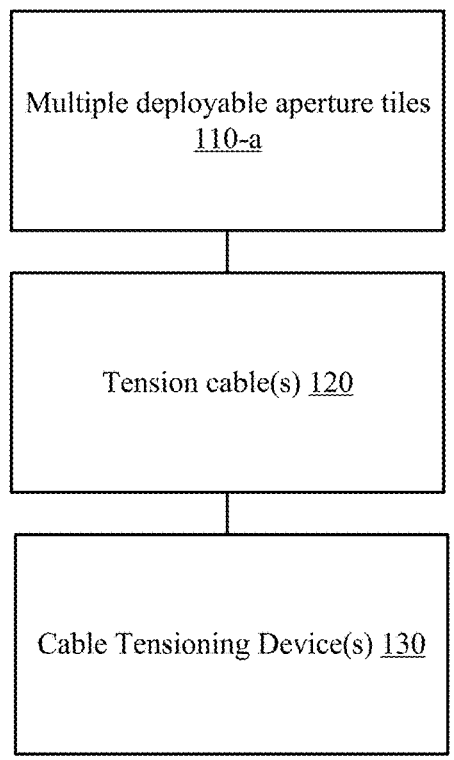
FIG. 1B shows a device in accordance with various embodiments.

FIG. 1B shows a device 100-a in accordance with various embodiments. Device 100-a may be an example of device 100 of FIG. 1A. Device 100-a may include multiple deployable aperture tiles 110-a. Device 100-a may include one or more tension cables 120 and/or one or more cable tensioning devices 130. The one or more tension cables 120 may pass through at least a portion of one or more of the multiple aperture tiles 110-a. The one or more cable tensioning devices 130 may include one or more tension cable spools and/or motors configured to facilitate deployment of the multiple aperture tiles 110-a from the stacked stowed configuration to the flat deployed configuration. The one or more tension cables 120 may be utilized to deploy the aperture tiles 110-a in one or more stages. Merely by way of example, a method of deploying the multiple aperture tiles 110-a may include applying tension to a first tension chord from one or more tension cables 120 that passes through two of more of multiple aperture tiles 110-a to deploy the multiple aperture tiles 110-a with respect to a first direction. In some embodiments, tension may be applied to a second tension chord from the one or more tension cables 120 that passes through two of more of the multiple aperture tiles 110-a to deploy the multiple aperture tiles 110-a with respect to a second direction that is perpendicular to the first direction.

The one or more cable tensioning devices 130 may include a variety of components. For example, the one or more cable tensioning devices 130 may involve actuating deployment by spooling up cables with pancake motors. Some embodiments may involve using a Negator spring or a simple clock spring configuration. A spring approach may enable single-use cable retraction on-orbit, and may be more reliable, lower mass, and less costly than a traditional motor.

Figure 2A:
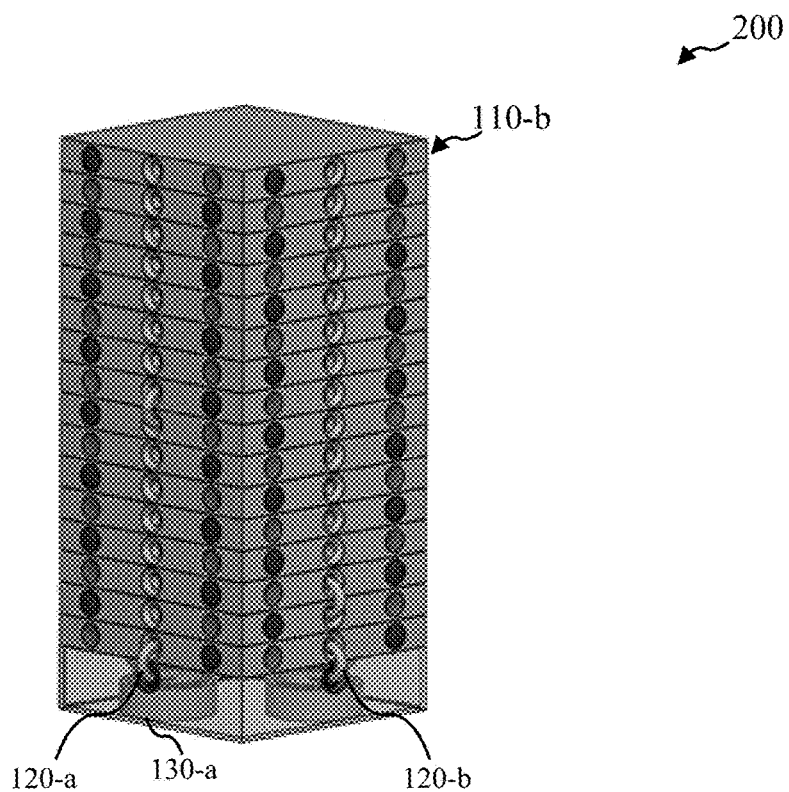
Figure 2B:
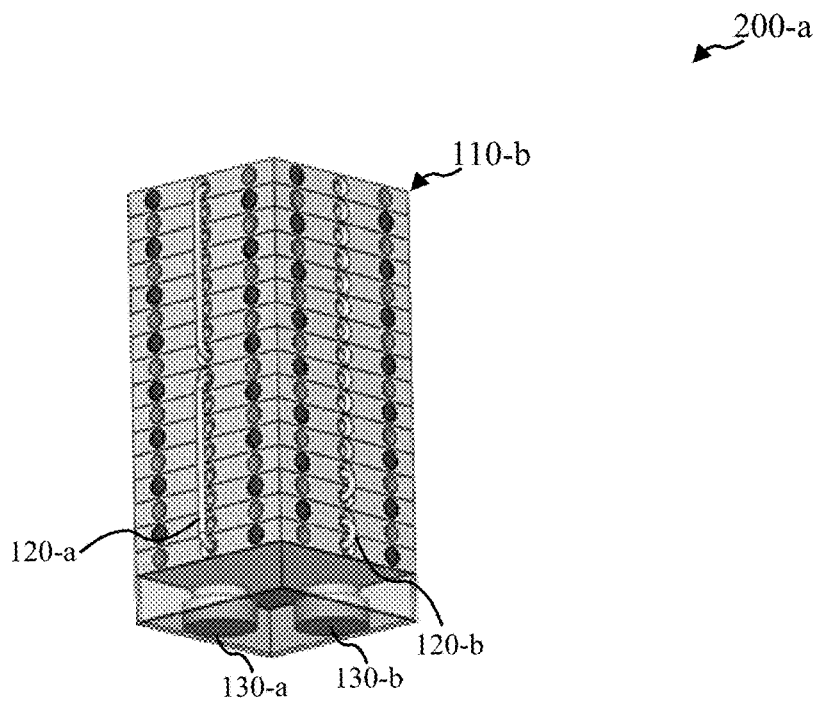

Turning now to FIG. 2A and FIG. 2B, two perspectives 200 and 200-a of a deployable tile aperture device in accordance with various embodiments are provided. This device may be an example of device 100 of FIG. 1A and/or device 100-a of FIG. 1B. The device may include multiple aperture tiles 110-b, one or more tension cables 120-a/120-b, and one or more cable tension devices 130-a/130-b. Passing the tension cables 120-a/120-b through some of the aperture tiles 110-b may facilitate deployment. In the stowed configuration, the tension cables 120-a/120-b may be slack and the aperture tiles 110-b may be easily stacked as shown in FIG. 2A and FIG. 2B. To deploy the device, the tension cables 120-a/120-b may be tensioned, which may cause the aperture tiles 110-b to rotate into a deployed position. Tension cables 120-a/120-b may be referred to as activation cables. The one or more cable tension devices 130-a/130-b may include cable spools, pancake motor, and/or spring motors, for example. Some embodiments may utilize 16 8 cm×8 cm×1 cm tiles arranged in a 4×4 configuration, though other numbers of tiles, dimensions of tiles, and configurations may be utilized.

Figure 2C:
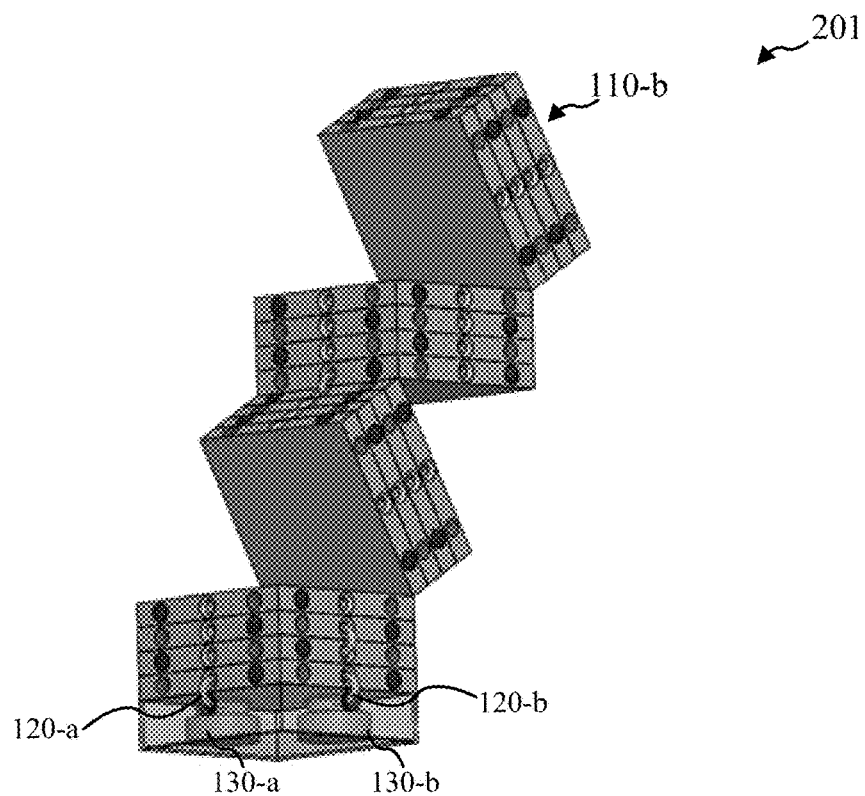
Figure 2D:
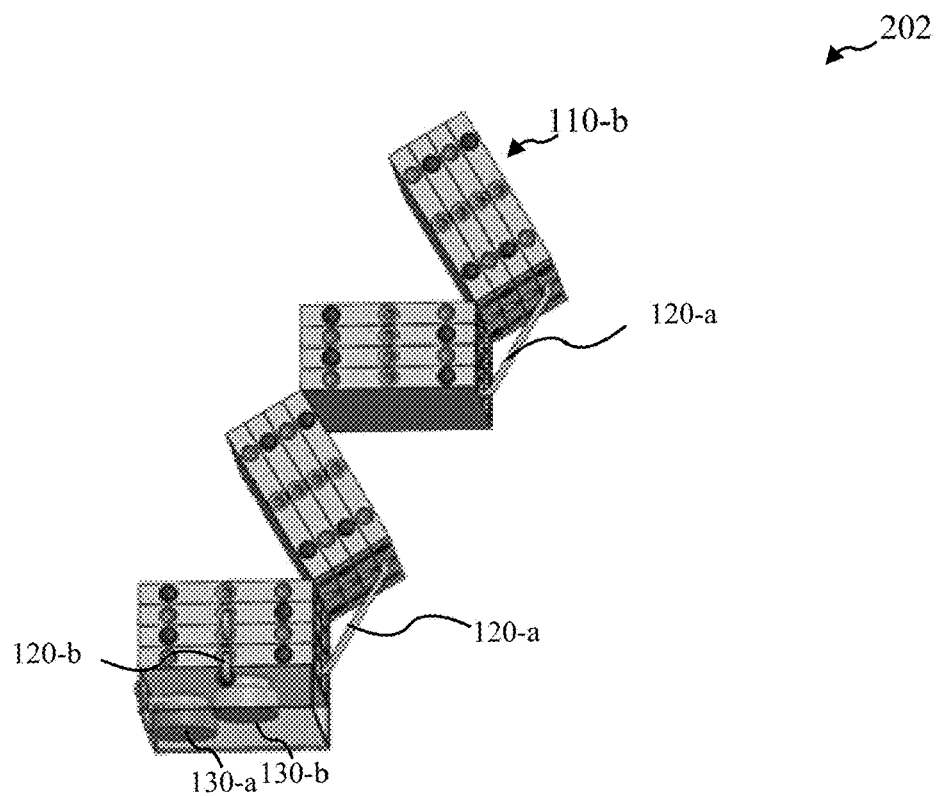
Figure 2E:
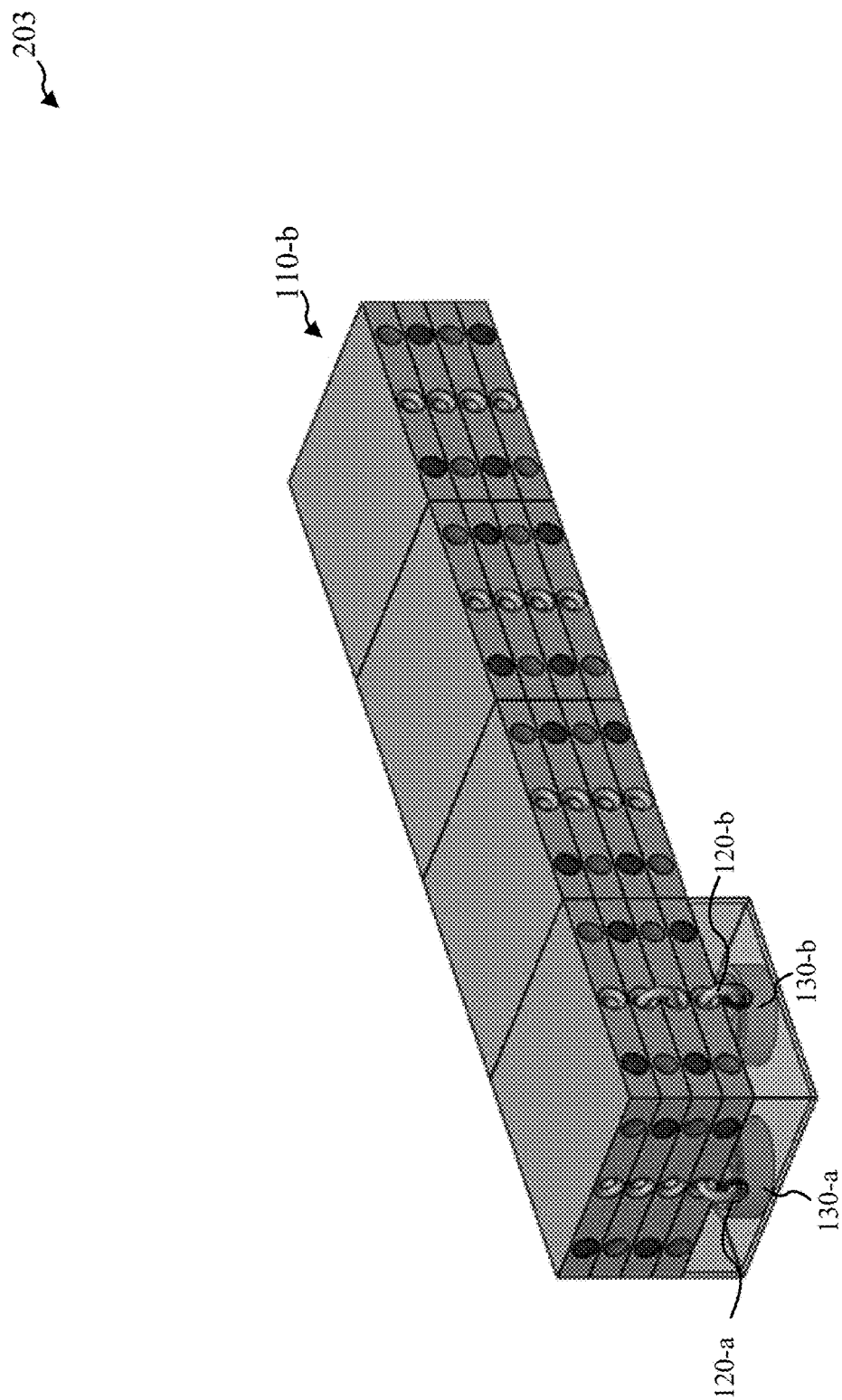

FIG. 2C, FIG. 2D, and FIG. 2E include a sequence 201, 202, and 203 of a first stage of deployment of a deployable tile aperture device in accordance with various embodiments are provided. During this first stage, tension cable 120-a may be tensioned. By applying tension to a first tension chord, such as tension cable 120-a, that passes through two of more of multiple aperture tiles 110-b, the multiple aperture tiles 110-b may be deployed with respect to a first direction as may be seen in FIG. 2E. For this stage, the cable tension device 130-a may be activated to tension the tension cable 120-a.

Figure 2F:
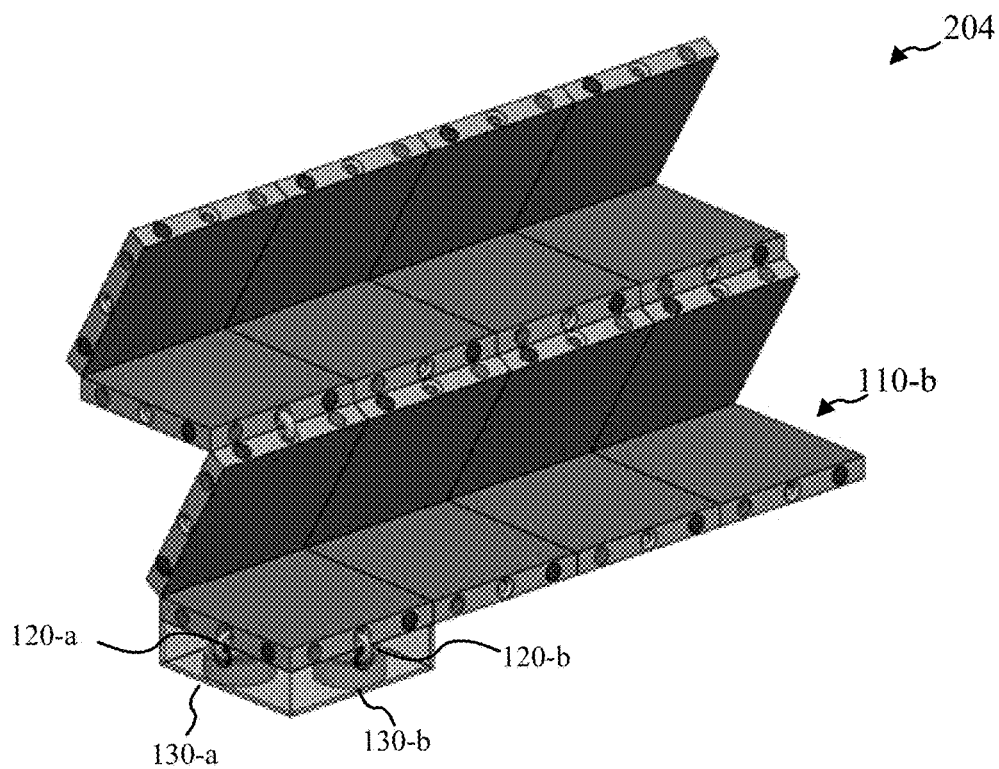
Figure 2G:
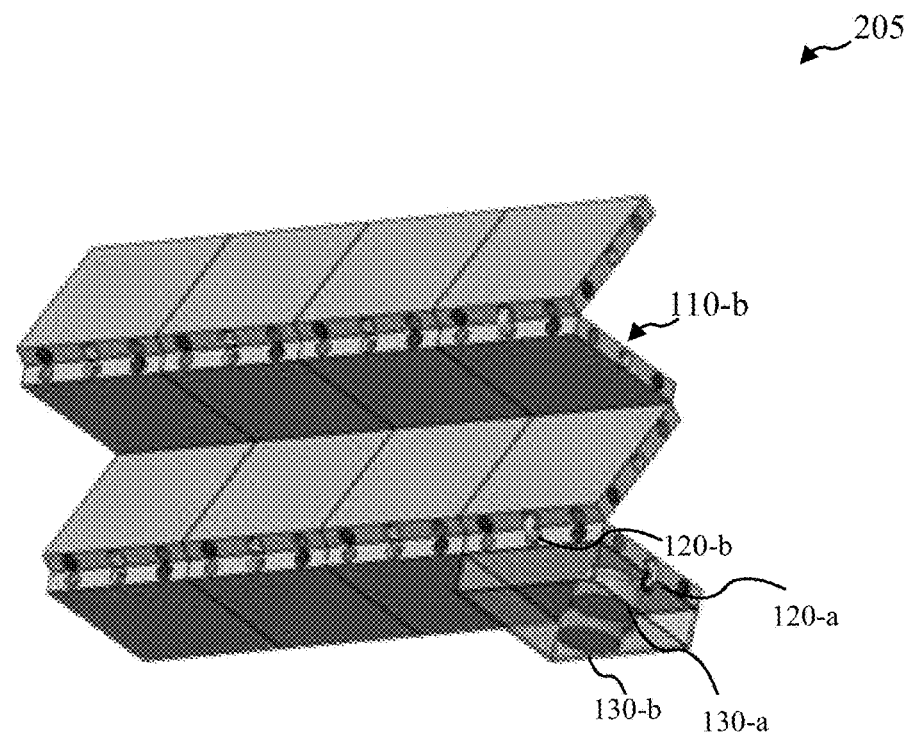

FIG. 2F, FIG. 2G, and FIG. 211 go on to provide a sequence 204, 205, and 206 of a second stage of deployment of a deployable tile aperture device in accordance with various embodiments is provided. During this second stage, tension cable 120-b may be tensioned. By applying tension to a second tension chord, such as tension cable 120-b, that passes through two of more of multiple aperture tiles 110-b, the multiple aperture tiles 110-b may be deployed with respect to a second direction as may be seen in FIG. 2H; the second direction may be perpendicular to the first direction. For this stage, the cable tension device 130-b may be activated to tension the tension cable 120-b. Sequence 206 may also show face hinges 210 that may be utilized in some embodiments. FIG. 2I then shows a bottom perspective 206-a of the deployed tile aperture device, which may also show back hinges 210-a. FIG. 2J shows a transparent perspective 206-b of the deployed tile aperture device.

Turning now to FIG. 3A, FIG. 3B, FIG. 3C, and FIG. 3D, deployable tile aperture devices 300, 300-a, 300-b, and 300-c in accordance with various embodiments are shown that may utilize one or more pulleys 310. Devices 300, 300-a, 300-b, and/or 300-c may be examples of device 100 of FIG. 1A. One or more pulleys 310 may be positioned at the hinge lines between two adjacent aperture tiles, such as tiles 110-c/110-d, where the tension cable 120-c may pass through to increase the torque exerted to activate the hinge. In situations where a pulley may not be utilized, the separation between a tension cable and the pivot may be very small, which may generate a small activation torque. Pulley 310 may allow the tension cable 120-c to generate larger torque to activate the hinge. In some embodiments, the pulley(s) 310 may protrude from each side of the deployed tile aperture device. In some embodiments, pulley 310 may be fabricated from RF transparent plastic, which may be utilized to avoid affecting RF performance for RF aperture devices. FIG. 3D may show a deployable tile aperture device 300-c similar to those shown in FIG. 2H, FIGS. 2I, and/or 2J, with pulleys 310-a/310-b.

Figure 4:
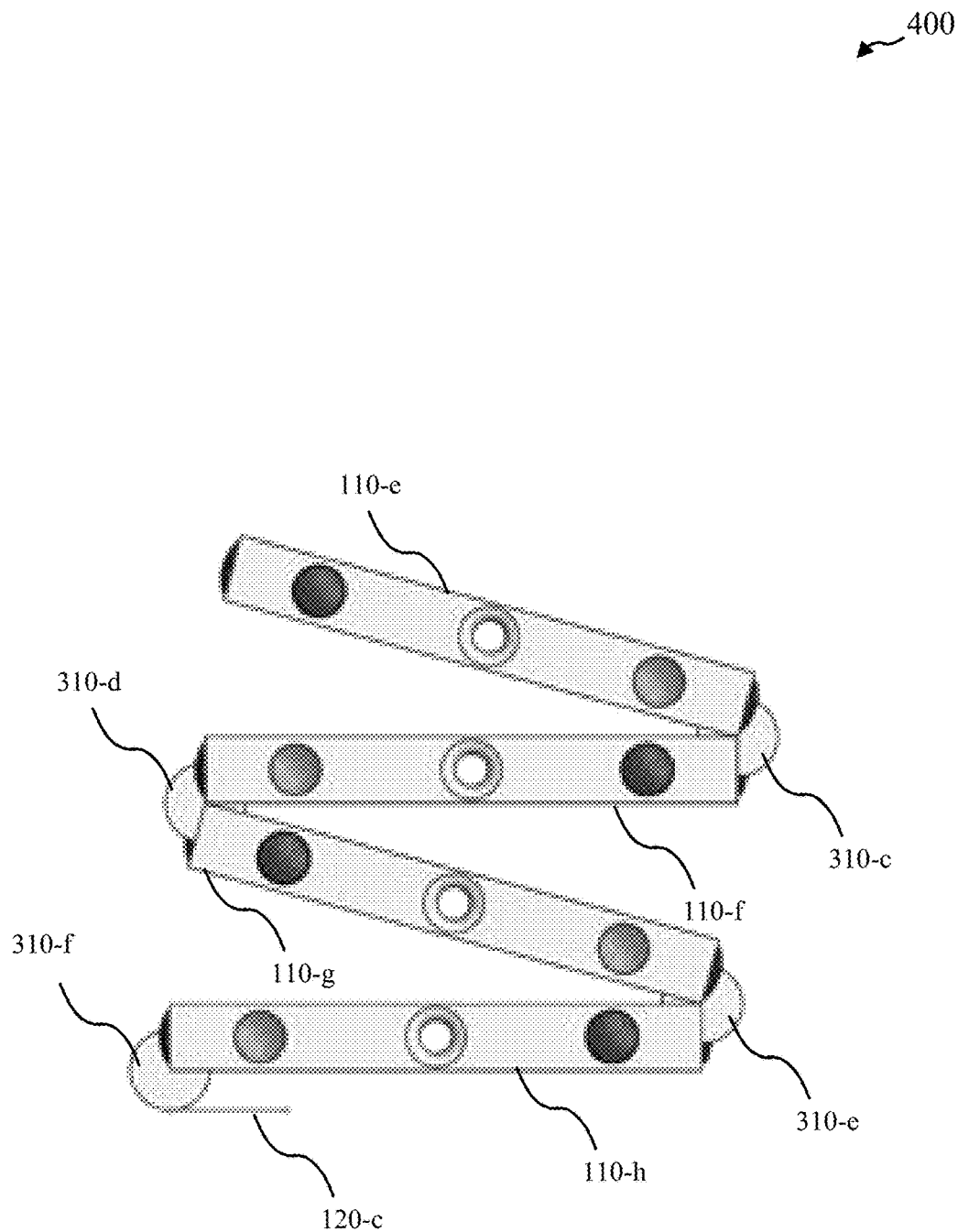
FIG. 4 shows a device in accordance with various embodiments.

In some embodiments, cable tension and/or pulley dimensions may be adapted to achieve different deployment forces. For example, FIG. 4 shows an example a deployable tile aperture device 400 with tension cable 120-c, pulleys 310-c/310-d/310-e/310-f, and aperture tiles 110-e/110-f/110-g/110-h. Merely by way of example, a simple calculation may be performed to estimate that a deployment force of 0.5 lb may be possible with 8 lb of cable tension if a 1 cm diameter (~0.4") pulley may be used. Device 400 may be an example of device 100 of FIG. 1A.

Figure 5:
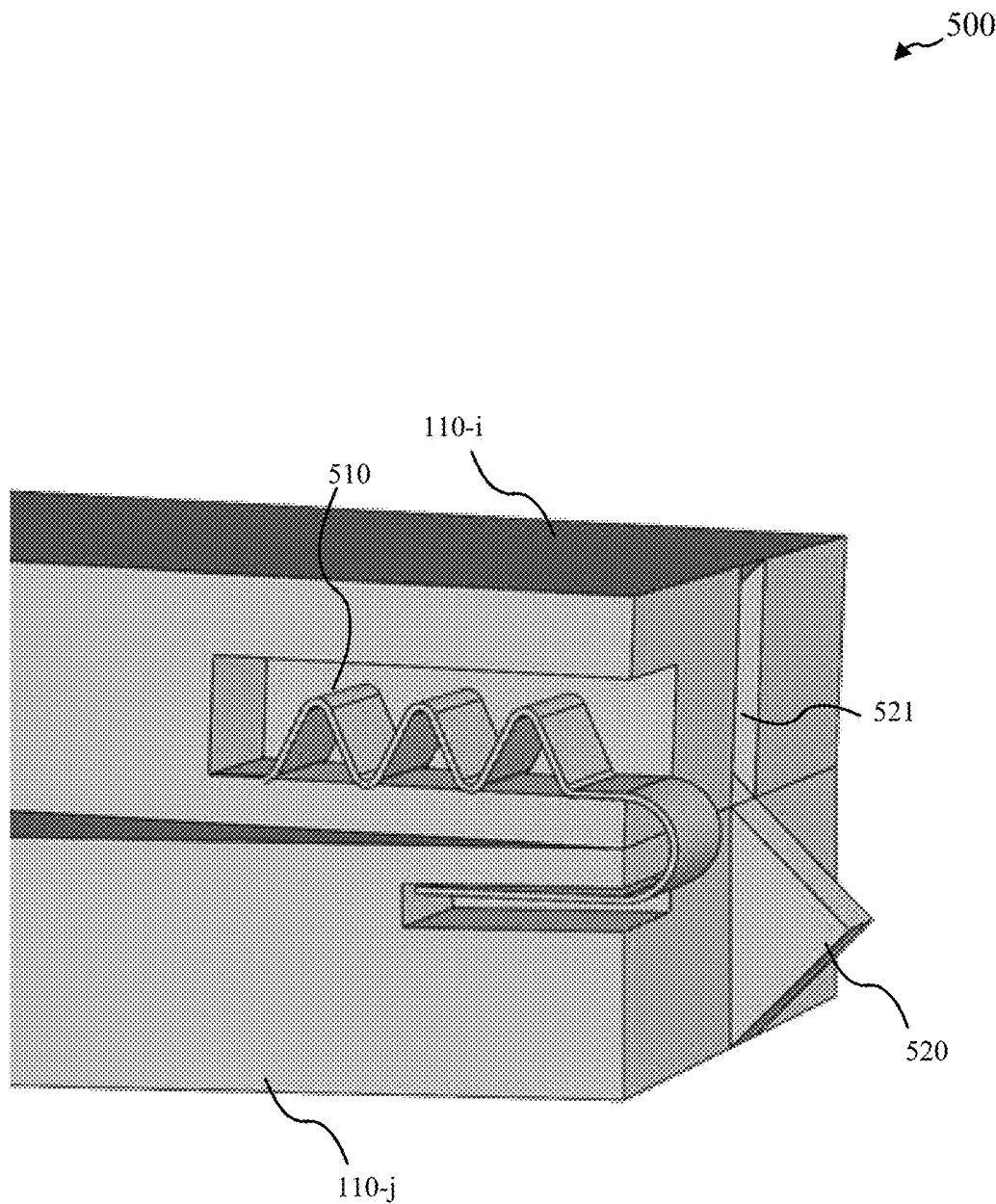
FIG. 5 shows a device in accordance with various embodiments.

FIG. 5 shows an example of a deployable tile aperture device 500 in accordance with various embodiments. Device 500 may show two aperture tiles 1104/110-j. A spring hinge 510 may facilitate deployment with an axial element that may shorten after deployment. Device 500 may also include interlocking wedge elements 520/521; in some embodiments, a hinge may not be involved as a result. Device 500 may be an example of device 100 of FIG. 1A.

Figure 6A:
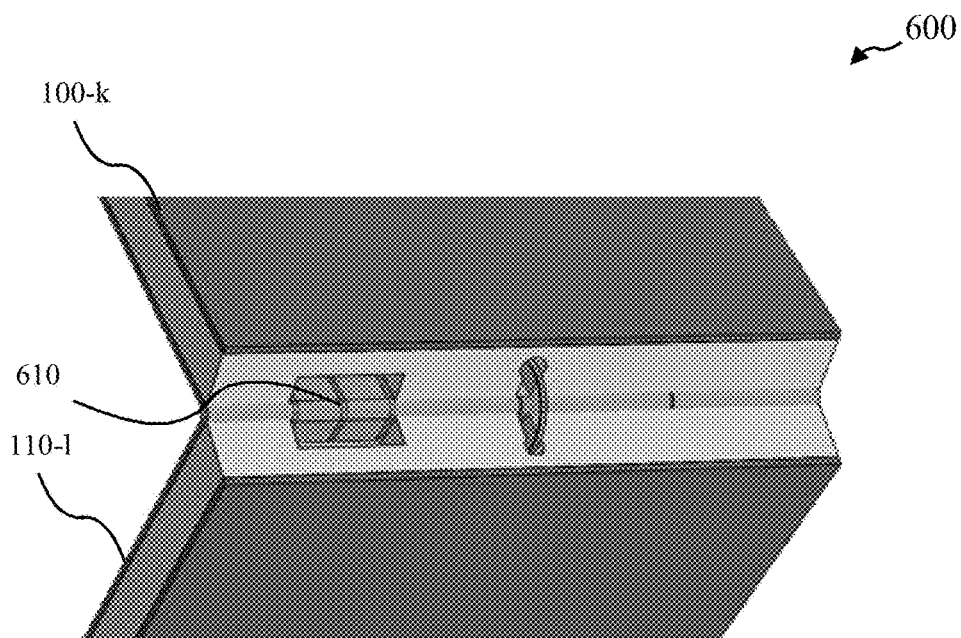
FIG. 6A and FIG. 6B show devices in accordance with various embodiments.
Figure 6B:
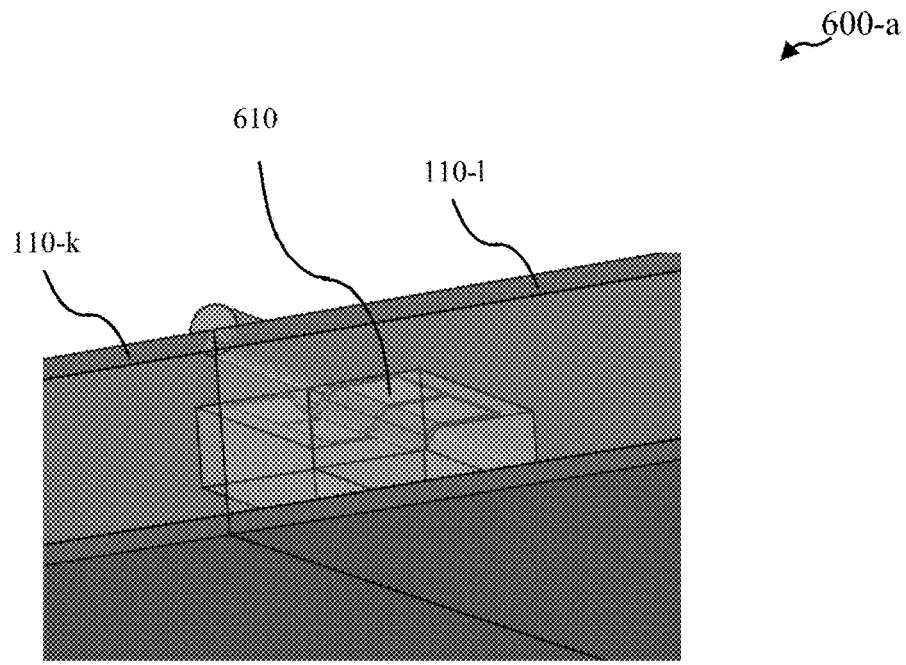

Turning now to FIG. 6A and FIG. 6B, deployable tile aperture devices 600 and 600-a are shown in accordance with various embodiments. These embodiments may provide for power to be transferred from aperture tile to aperture tile in the deployed configuration. For example, thin flex circuit 610 may cross the hinge lines between tiles 110-k/110-l and may accommodate the required displacements for stowage and deployment. Devices 600 and 600-a may be examples of device 100 of FIG. 1A.

Figure 7A:
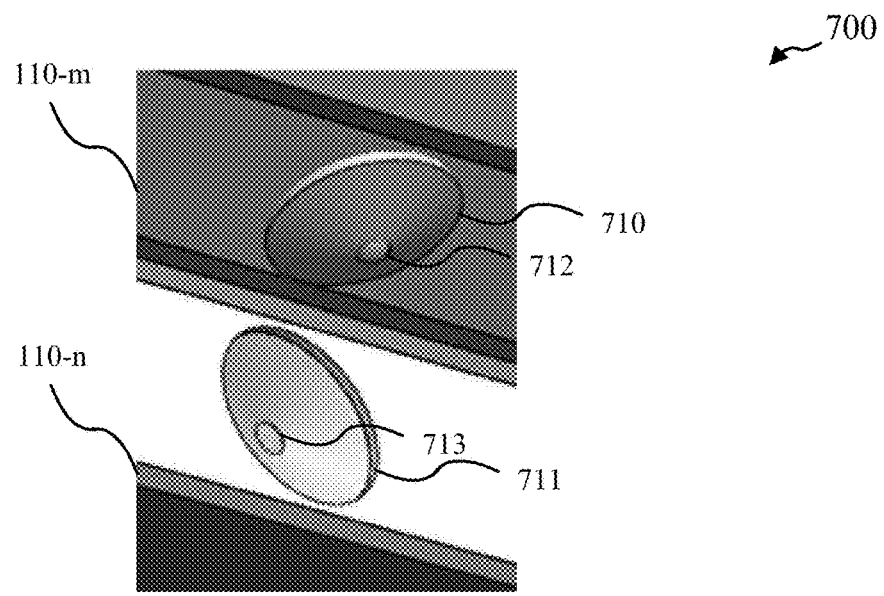
FIG. 7A and FIG. 7B show devices in accordance with various embodiments.
Figure 7B:
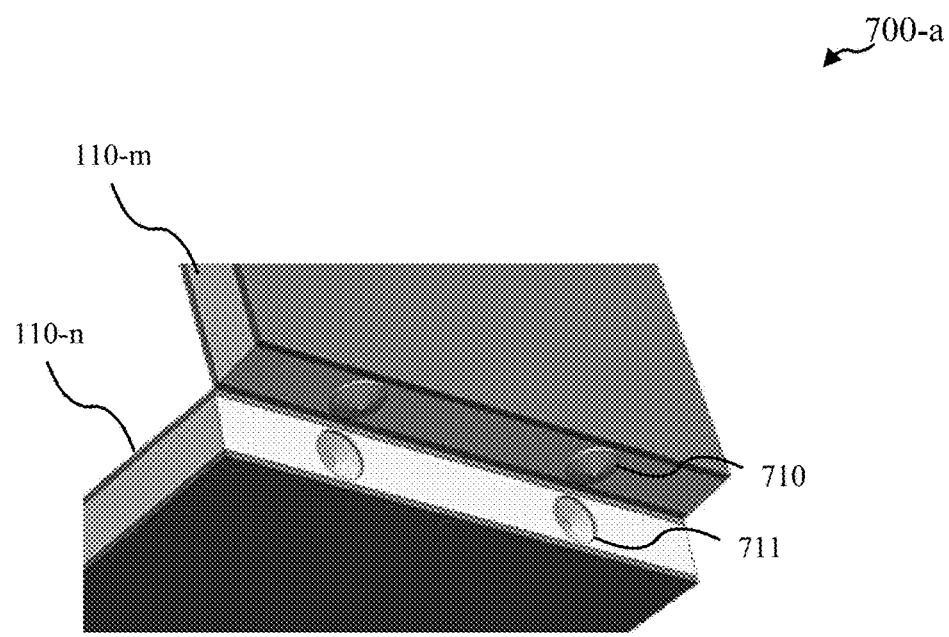

FIG. 7A and FIG. 7B show deployable tile aperture devices 700 and 700-a in accordance with various embodiments that may provide another option for providing electrical connectivity between aperture tiles 110-m/110-n. Cup and cone features 711/710, respectively, may provide electrical connectivity between apertures tiles; in some embodiments, the cone feature may include a spring-loaded conductive pin 712 and the cup feature may include a conductive pad 713.

Figure 8A:
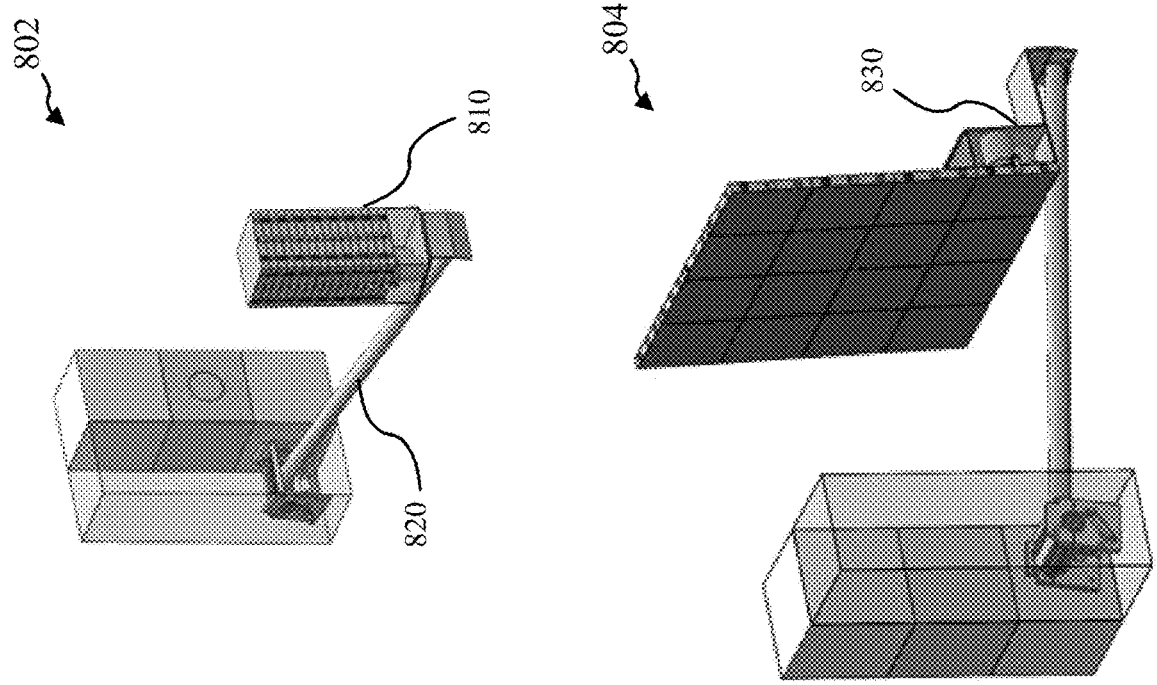
FIG. 8A and FIG. 8B show systems in accordance with various embodiments.

Turning now to FIG. 8A, a deployment sequence at stages 801, 802, 803, and 804 of a deployable tile aperture device 810 is provided in accordance with various embodiments. Stage 801 shows a stowed stage, while stages 802, 803, and 804 show deployment to a deployed stage 804. The different stages may show the deployable tile aperture device 810, a deployment mast 820, a deployment hinge 830, and/or a feed horn 840. Device 810 may be an example of device 100 of FIG. 1A and/or device 100-a of FIG. 1B. Some embodiments may utilize 16 8 cm×8 cm×1 cm tiles arranged in a 4×4 configuration, though other numbers of tiles, dimensions of tiles, and configurations may be utilized.

This deployment sequence may help orient a tile aperture, such as an RF tile aperture with respect to the feed located at a spacecraft. Deployment hinge 830 may be utilized to orient the aperture 810. In some embodiments, the entire aperture subsystem, including of the RF tiles, deployment motors and positioning boom may fit within a 3U volume, though other embodiments may fit other volumes.

Figure 8B:
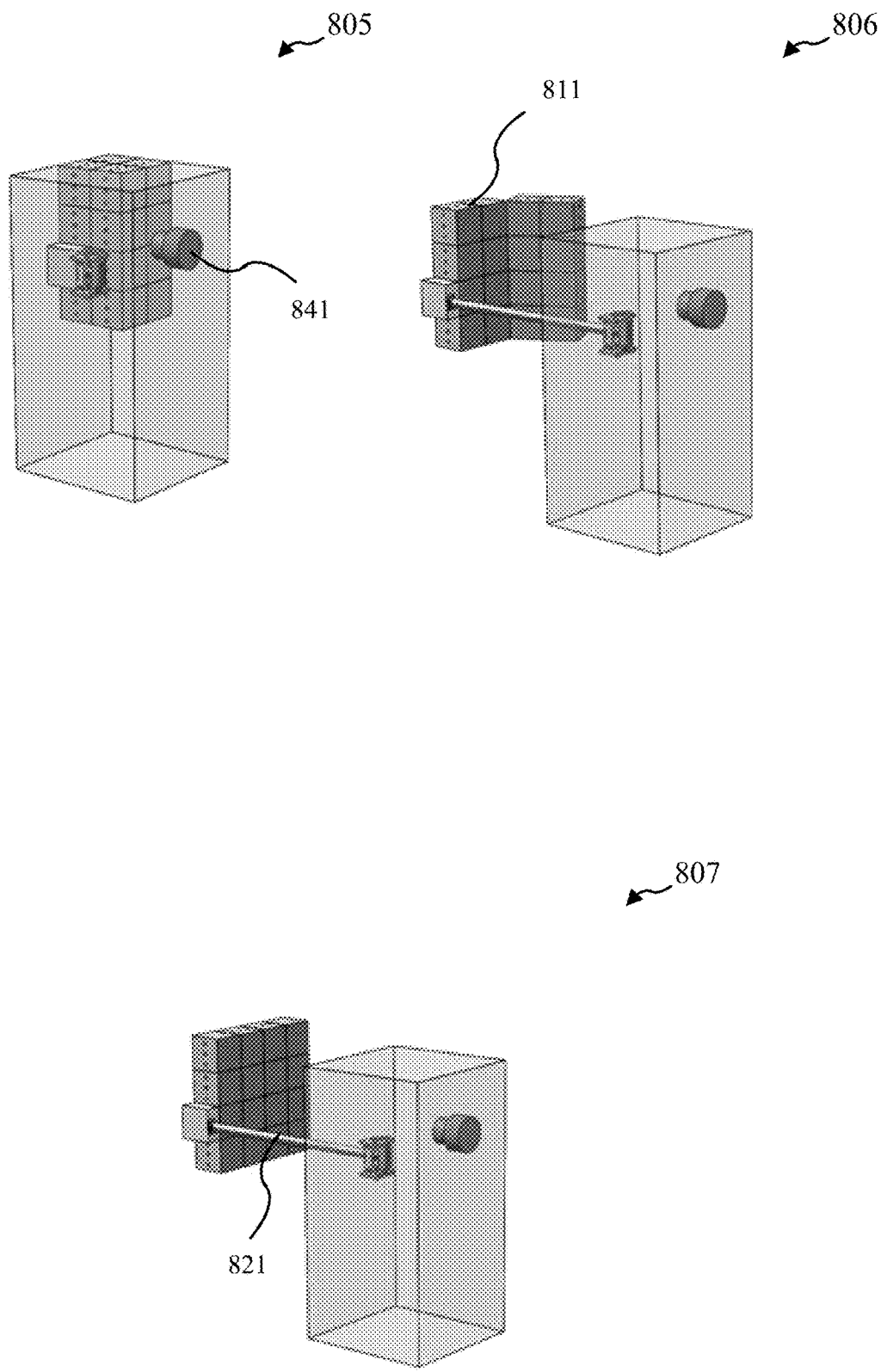

FIG. 8B shows another deployment sequence at stages 805, 806, and 807 of a deployable aperture device 811 in accordance with various embodiments. Stage 805 shows a stowed stage, while stages 806 and 807 show deployment stages to deployed state 807. The different stages may show the deployable tile aperture device 811, a deployment mast 821, and/or a feed horn 841. Device 811 may be an example of device 100 of FIG. 1A and/or device 100-*a* of FIG. 1B. Some embodiments may utilize 16 10 cm×10 cm×10 cm tiles arranged in a 4×4 configuration, though other numbers of tiles, dimensions of tiles, and configurations may be utilized.

In some embodiments, deployable tile aperture device 811 may include 16 10 cm×10 cm×10 cm tiles, though other tile numbers and dimensions may be utilized in other embodiments. This embodiment may provide an example of stowed tiles housed within an ESPA-class satellite. There are many options for how the tiles may be stowed depending on the available stowage envelope. For this embodiment, a simple configuration that includes a single-stage deployment may be utilized.

Figure 9:
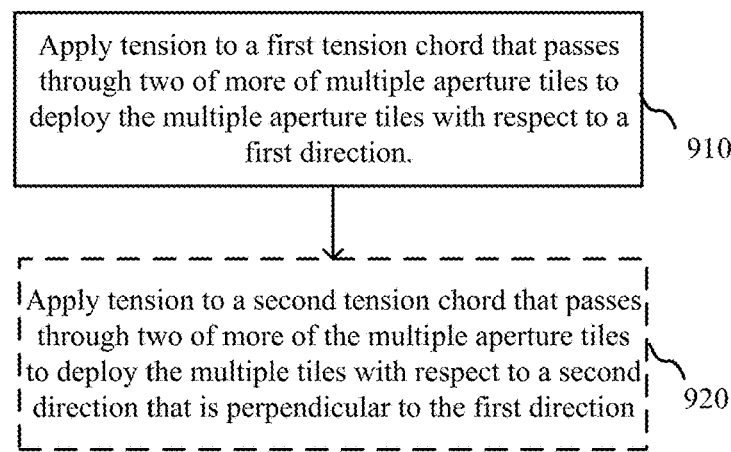
FIG. 9 shows a flow diagram of a method in accordance with various embodiments.

Turning now to FIG. 9, a flow diagram of a method 900 is shown in accordance with various embodiments. Method 900 may be implemented utilizing a variety of systems and/or devices such as those shown and/or described with respect to FIG. 1A, FIG. 1B, FIG. 2A, FIG. 2B, FIG. 2C, FIG. 2D, FIG. 2E, FIG. 2F, FIG. 2G, FIG. 2H, FIG. 2I, FIG. 2J, FIG. 3A, FIG. 3B, FIG. 3C, FIG. 3D, FIG. 4, FIG. 5, FIG. 6A, FIG. 6B, FIG. 7A, FIG. 7B, FIG. 8A, and/or FIG. 8B.

At block 910, tension may be applied to a first tension chord that passes through two of more of multiple aperture tiles to deploy the multiple aperture tiles with respect to a first direction. Some embodiments include a block 920 where tension may be applied to a second tension chord that passes through two of more of the multiple aperture tiles to deploy the multiple aperture tiles with respect to a second direction that is perpendicular to the first direction.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A device comprising:
    a plurality of aperture tiles coupled with each other such the plurality of aperture tiles have a stacked stowed configuration and a flat deployed configuration, wherein the plurality of aperture tiles include a plurality of cap and cone structures configured to couple with each other when the plurality of aperture tiles are deployed to the flat deployed configuration and wherein the plurality of cap and cone structures include a plurality of conductive pin structures and a plurality of conductive pad structures to facilitate electrical connectivity between the plurality of aperture tiles.

2. The device of claim 1, further comprising one or more tension chords configured to deploy the plurality of aperture tiles when tension is applied to the one or more tension chords.

3. The device of claim 2, wherein the one or more tension chords pass through at least a portion of one or more of the plurality of aperture tiles.

4. The device of claim 2, further comprising one or more tension cable spools and/or motors configured to facilitate deployment of the plurality of aperture tiles from the stacked stowed configuration to the flat deployed configuration.

5. The device of claim 2, further comprising a constant force spring configured to facilitate deployment of the plurality of aperture tiles from the stacked stowed configuration to the flat deployed configuration.

6. The device of claim 1, wherein the flat deployed configuration includes at least one side edge portion of each aperture tile from the plurality of aperture tiles making contact with another side edge portion of another aperture tile from the plurality of aperture tiles.

7. The device of claim 6, wherein flat deployed configuration forms one or more continuous face surfaces formed from plurality of aperture tiles.

8. The device of claim 1, wherein the plurality of aperture tiles are configured as a radio frequency aperture.

9. The device of claim 8, wherein the radio frequency aperture includes a radio frequency reflective side and a ground plane side formed from the plurality of aperture tiles.

10. The device of claim 1, wherein the plurality of aperture tiles are configured as a solar array aperture.

11. The device of claim 1, further comprising a plurality of pulleys, wherein each respective pulley from the plurality of pulleys are:
    positioned with respect to a hinge line between two aperture tiles from the plurality of aperture tiles; and
    make contact with a portion of at least one of the one or more tension chords.

12. The device of claim 1, further comprising a plurality of flex circuits configured to facilitate electrical connectivity between the plurality of aperture tiles.

13. The device of claim 1, further comprising a plurality of spring hinges positioned between the plurality of aperture tiles to facilitate deployment of the plurality of aperture tiles from the stacked stowed configuration to the flat deployed configuration.

14. The device of claim 13, further comprising a plurality interlocking wedge elements configured to interlock when the plurality of aperture tiles are in the flat deployed configuration.

15. A method of deploying a plurality of aperture tiles comprising:

applying tension to a first tension chord that passes through two of more of a plurality of aperture tiles to deploy the plurality of aperture tiles with respect to a first direction, wherein the plurality of aperture tiles are coupled with each other such the plurality of aperture tiles have a stacked stowed configuration and a flat deployed configuration and the plurality of aperture tiles include a plurality of cap and cone structures configured to couple with each other when the plurality of aperture tiles are deployed to the flat deployed configuration and wherein the plurality of cap and cone structures include a plurality of conductive pin structures and a plurality of conductive pad structures to facilitate electrical connectivity between the plurality of aperture tiles.

16. The method of claim 15, further comprising;

applying tension to a second tension chord that passes through two of more of the plurality of aperture tiles to deploy the plurality of aperture tiles with respect to a second direction that is perpendicular to the first direction.

* * * * *